(12) United States Patent (10) Patent No.: US 11,568,879 B2
Roblek et al. (45) Date of Patent: *Jan. 31, 2023

(54) SEGMENT-BASED SPEAKER VERIFICATION USING DYNAMICALLY GENERATED PHRASES

(71) Applicant: Google LLC, Mountain View, CA (US)

(72) Inventors: Dominik Roblek, Meilen (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/303,928

(22) Filed: Jun. 10, 2021

(65) Prior Publication Data

US 2021/0295850 A1 Sep. 23, 2021

Related U.S. Application Data

(63) Continuation of application No. 16/675,420, filed on Nov. 6, 2019, now Pat. No. 11,056,120, which is a
(Continued)

(51) Int. Cl.
*G10L 17/24* (2013.01)
*G10L 17/04* (2013.01)
*G10L 15/02* (2006.01)

(52) U.S. Cl.
CPC .............. *G10L 17/24* (2013.01); *G10L 15/02* (2013.01); *G10L 17/04* (2013.01); *G10L 2015/025* (2013.01)

(58) Field of Classification Search
CPC ......... G10L 17/24; G10L 17/04; G10L 15/02; G10L 2015/025
(Continued)

(56) References Cited

U.S. PATENT DOCUMENTS 3,812,320 A 5/1974 Borgren et al.
5,088,097 A 2/1992 Ono et al.
(Continued)

FOREIGN PATENT DOCUMENTS

JP 2003302999 A 10/2003
JP 2005128307 A 5/2005
WO 2011090829 A2 7/2011

OTHER PUBLICATIONS

Japanese Office Action for the related Application No. 2017-233255 dated Feb. 18, 2019.
(Continued)

*Primary Examiner* — Susan I McFadden
(74) *Attorney, Agent, or Firm* — Honigman LLP; Brett A. Krueger; Grant Griffith

(57) ABSTRACT

Methods, systems, and apparatus, including computer programs encoded on a computer storage medium, for verifying an identity of a user. The methods, systems, and apparatus include actions of receiving a request for a verification phrase for verifying an identity of a user. Additional actions include, in response to receiving the request for the verification phrase for verifying the identity of the user, identifying subwords to be included in the verification phrase and in response to identifying the subwords to be included in the verification phrase, obtaining a candidate phrase that includes at least some of the identified subwords as the verification phrase. Further actions include providing the verification phrase as a response to the request for the verification phrase for verifying the identity of the user.

18 Claims, 5 Drawing Sheets

Related U.S. Application Data continuation of application No. 16/017,690, filed on Jun. 25, 2018, now Pat. No. 10,504,524, which is a continuation of application No. 15/669,701, filed on Aug. 4, 2017, now Pat. No. 10,037,760, which is a continuation of application No. 15/191,886, filed on Jun. 24, 2016, now Pat. No. 9,741,348, which is a continuation of application No. 14/447,115, filed on Jul. 30, 2014, now Pat. No. 9,424,846, which is a continuation of application No. 14/242,098, filed on Apr. 1, 2014, now Pat. No. 8,812,320.

(58) Field of Classification Search
USPC .......................................................... 704/249
See application file for complete search history.

(56) References Cited

U.S. PATENT DOCUMENTS

| | | | |
|---|---|---|---|
| 7,289,957 B1 | 10/2007 | Grashey et al. | |
| 8,812,319 B2* | 8/2014 | Skerpac | G06F 21/32 |
| | | | 704/246 |
| 8,812,320 B1* | 8/2014 | Roblek | G10L 17/24 |
| | | | 704/246 |
| 9,281,899 B2 | 3/2016 | Wang et al. | |
| 9,424,846 B2* | 8/2016 | Roblek | G10L 17/04 |
| 9,741,348 B2* | 8/2017 | Roblek | G10L 17/04 |
| 10,037,760 B2 | 7/2018 | Roblek et al. | |
| 10,504,524 B2* | 12/2019 | Roblek | G10L 17/04 |
| 11,056,120 B2* | 7/2021 | Roblek | G10L 17/24 |
| 2002/0075919 A1 | 6/2002 | Fochio | |
| 2005/0128307 A1 | 6/2005 | Kobayashi et al. | |
| 2012/0130714 A1 | 5/2012 | Zeljkovic et al. | |
| 2013/0132091 A1 | 5/2013 | Skerpac | |
| 2014/0341593 A1 | 11/2014 | van Veen et al. | |
| 2015/0063812 A1 | 3/2015 | Dove et al. | |

OTHER PUBLICATIONS

European Search Report for the related EP application No. 18175789.9 dated Sep. 25, 2018.

* cited by examiner

SEGMENT-BASED SPEAKER VERIFICATION USING DYNAMICALLY GENERATED PHRASES

CROSS-REFERENCE TO RELATED APPLICATIONS

This U.S. patent application is a continuation of, and claims priority under 35 U.S.C. § 120 from, U.S. patent application Ser. No. 16/675,420, filed on Nov. 6, 2019, which is a continuation of U.S. patent application Ser. No. 16/017,690, filed on Jun. 25, 2018 (now U.S. Pat. No. 10,504,524), which is a continuation of U.S. patent application Ser. No. 15/669,701, filed on Aug. 4, 2017 (now U.S. Pat. No. 10,037,760), which is a continuation of U.S. application Ser. No. 15/191,886, filed on Jun. 24, 2016 (now U.S. Pat. No. 9,741,348), which is a continuation of U.S. application Ser. No. 14/447,115, filed Jul. 30, 2014 (now U.S. Pat. No. 9,424,846), which is a continuation of U.S. application Ser. No. 14/242,098, filed Apr. 1, 2014 (now U.S. Pat. No. 8,812,320). The disclosures of these prior applications are considered part of the disclosure of this application and are hereby incorporated by reference in their entireties.

TECHNICAL FIELD

This disclosure generally relates to speaker verification.

BACKGROUND

A computer may perform speaker verification to verify an identity of a speaker. For example, a computer may verify an identity of speaker as a particular user based on verifying that acoustic data representing the speaker's voice matches acoustic data representing the particular user's voice.

SUMMARY

In general, an aspect of the subject matter described in this specification may involve a process for verifying an identity of a speaker. Speaker verification occurs by matching acoustic data representing an utterance from a speaker with acoustic data representing utterances from the particular user.

The system may perform speaker verification by always asking a speaker to speak the same phrase, e.g., "FIXED VERIFICATION PHRASE." This approach may be accurate but may be prone to spoofing. For example, a recording of the particular user speaking the phrase may be replayed. Alternatively, the system may allow a speaker to independently speak a phrase, e.g., "RANDOM VERIFICATION PHRASE." However, this approach may be less accurate. For example, the system may be unable to determine what phrase was said by the speaker.

The system may address the above issues with speaker verification by providing a verification phrase that is dynamically generated based on training acoustic data stored for the particular user. For example, the system may provide the verification phrase, e.g., "HAMMER," to a speaker to be verified as a particular user based on determining that the system stores training acoustic data representing the particular user speaking the subword "HAM."

In response to providing the verification phrase, the system may obtain acoustic data representing the speaker speaking the verification phrase and verify an identity of the speaker as the particular user using the obtained acoustic data. For example, the system may verify the identity of the speaker as the particular user based on determining that obtained acoustic data representing the speaker speaking the subword "HAM" in "HAMMER" matches training acoustic data representing the particular user speaking the subword "HAM."

If the system verifies an identity of the speaker as the particular user, the system may store the obtained acoustic data as training acoustic data for the particular user. For example, the system may store acoustic data representing the speaker speaking the subword "MER" as acoustic data representing the particular user speaking the subword "MER." In the future when verifying an identity of a speaker as the particular user, the system may compare acoustic data representing a speaker speaking the subword "MER" with the newly stored training acoustic data representing the particular user speaking the subword "MER." For example, the next time the system performs speaker verification to verify a speaker as the particular user, the system may provide a different verification phrase, e.g., "JAMMER," based on determining that the system stores training acoustic data representing the particular user speaking the subword "MER."

In some aspects, the subject matter described in this specification may be embodied in methods that may include the actions of receiving a request for a verification phrase for verifying an identity of a user. Additional actions include, in response to receiving the request for the verification phrase for verifying the identity of the user, identifying subwords to be included in the verification phrase and in response to identifying the subwords to be included in the verification phrase, obtaining a candidate phrase that includes at least some of the identified subwords as the verification phrase. Further actions include providing the verification phrase as a response to the request for the verification phrase for verifying the identity of the user.

Other versions include corresponding systems, apparatus, and computer programs, configured to perform the actions of the methods, encoded on computer storage devices.

These and other versions may each optionally include one or more of the following features. For instance, in some implementations identifying subwords to be included in the verification phrase includes identifying candidate subwords, for which stored acoustic data is associated with the user, as one or more of the subwords to be included in the verification phrase.

In certain aspects, obtaining a candidate phrase that includes at least some of the identified subwords as the verification phrase includes determining that a particular identified subword is particularly sound discriminative and in response to determining that the particular identified subword is particularly sound discriminative, obtaining a candidate phrase that includes the particular identified subword that is determined to be particularly sound discriminative.

In some aspects, obtaining a candidate phrase that includes at least some of the identified subwords as the verification phrase includes obtaining multiple candidate phrases including the candidate that includes at least some of the identified subwords, determining that the candidate phrase includes at least some of the identified subwords, and in response to determining that the candidate phrase includes at least some of the identified subwords, selecting the determined candidate phrase as the candidate phrase that includes at least some of the identified subwords from among the multiple candidate phrases.

In some implementations, actions include obtaining acoustic data representing the user speaking the verification phrase, determining that the obtained acoustic data matches stored acoustic data for the user, and in response to determining that the obtained acoustic data matches stored acoustic data for the user, classifying the user as the user.

In certain aspects, determining that the obtained acoustic data matches stored acoustic data for the user includes determining that stored acoustic data for the at least some of the identified subwords in the verification phrase match obtained acoustic data that correspond to the at least some of the identified subwords in the verification phrase.

In some aspects, identifying subwords to be included in the verification phrase includes identifying candidate subwords, for which no stored acoustic data is associated with the user, as one or more of the subwords to be included in the verification phrase. Obtaining a candidate phrase that includes at least some of the identified subwords as the verification phrase includes obtaining a candidate phrase that includes at least one candidate subword for which stored acoustic data is associated with the user and at least one candidate subword for which no stored acoustic data is associated with the user.

In some implementations, actions include storing acoustic data from the obtained acoustic data that corresponds to the identified candidate subwords, for which no stored acoustic data is associated with the user, in association with the user.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
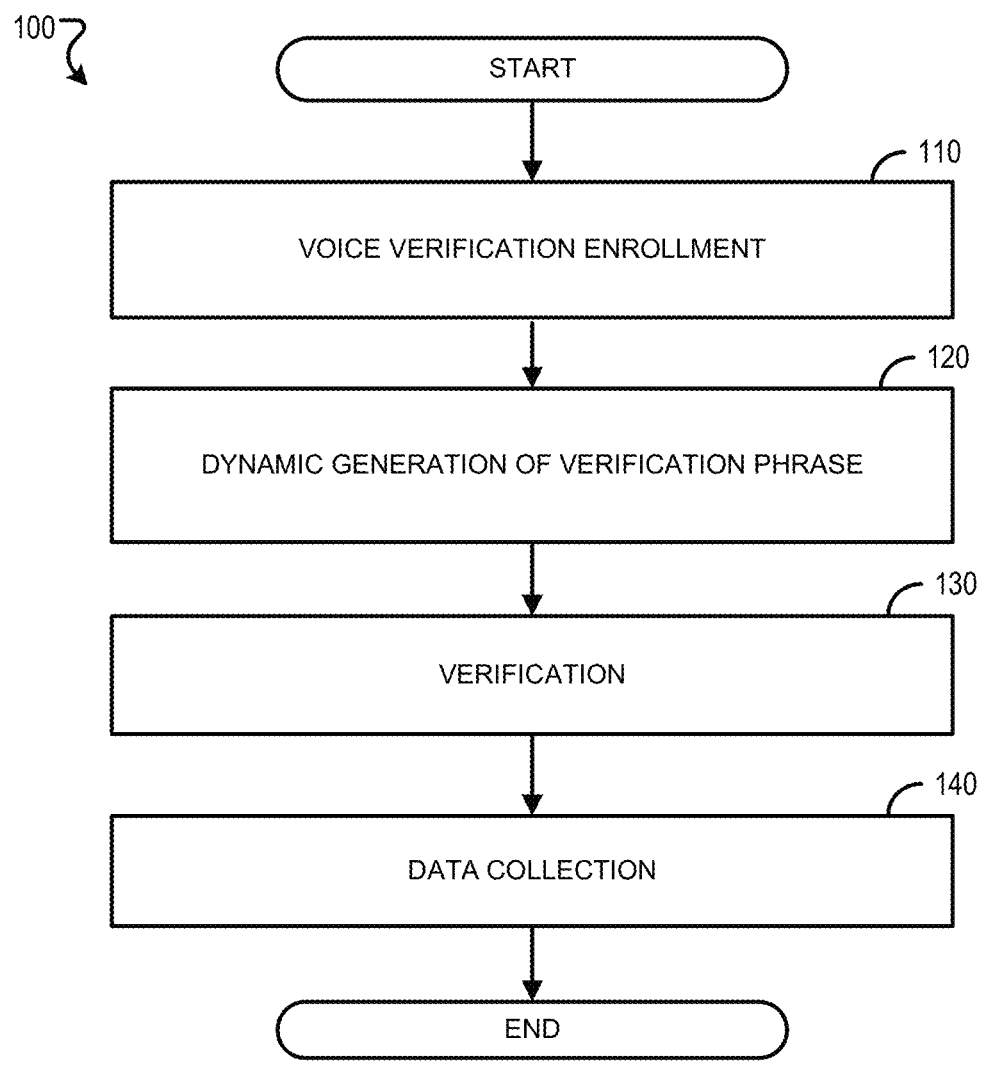
FIG. 1 is a flowchart of an example process for verifying an identity of a speaker.

FIG. 1 is a flowchart of an example process 100 for verifying an identity of a speaker. Generally, the process 100 may include a voice verification enrollment stage (110). For example, a system may prompt a particular user to speak an enrollment phrase and store training acoustic data representing the particular user speaking the enrollment phrase. Acoustic data for each of the subwords may be, for example, MFCC coefficients or filterbank energies representing the particular user speaking each of the subwords. Subwords may be a phoneme or a sequence of two or more phonemes, e.g., a triphone. The voice verification enrollment stage is exemplified in FIG. 2.

The process 100 may include a dynamic generation of a verification phrase stage (120). For example, in response to a request for a verification phrase, the system may dynamically generate a verification phrase for verifying an identity of a speaker. The dynamic generation of a verification phrase stage is exemplified in FIG. 3.

The process 100 may include a verification stage (130). For example, the system may receive acoustic data representing a speaker speaking the verification phrase and verify the speaker as the particular user based on the obtained acoustic data. The verification stage is exemplified in FIG. 4.

The process 100 may include a data collection stage (140). For example, after verifying the speaker as the particular user, the system may store the obtained acoustic data as acoustic data representing the particular user speaking. The data collection stage is exemplified in FIG. 4.

Figure 2:
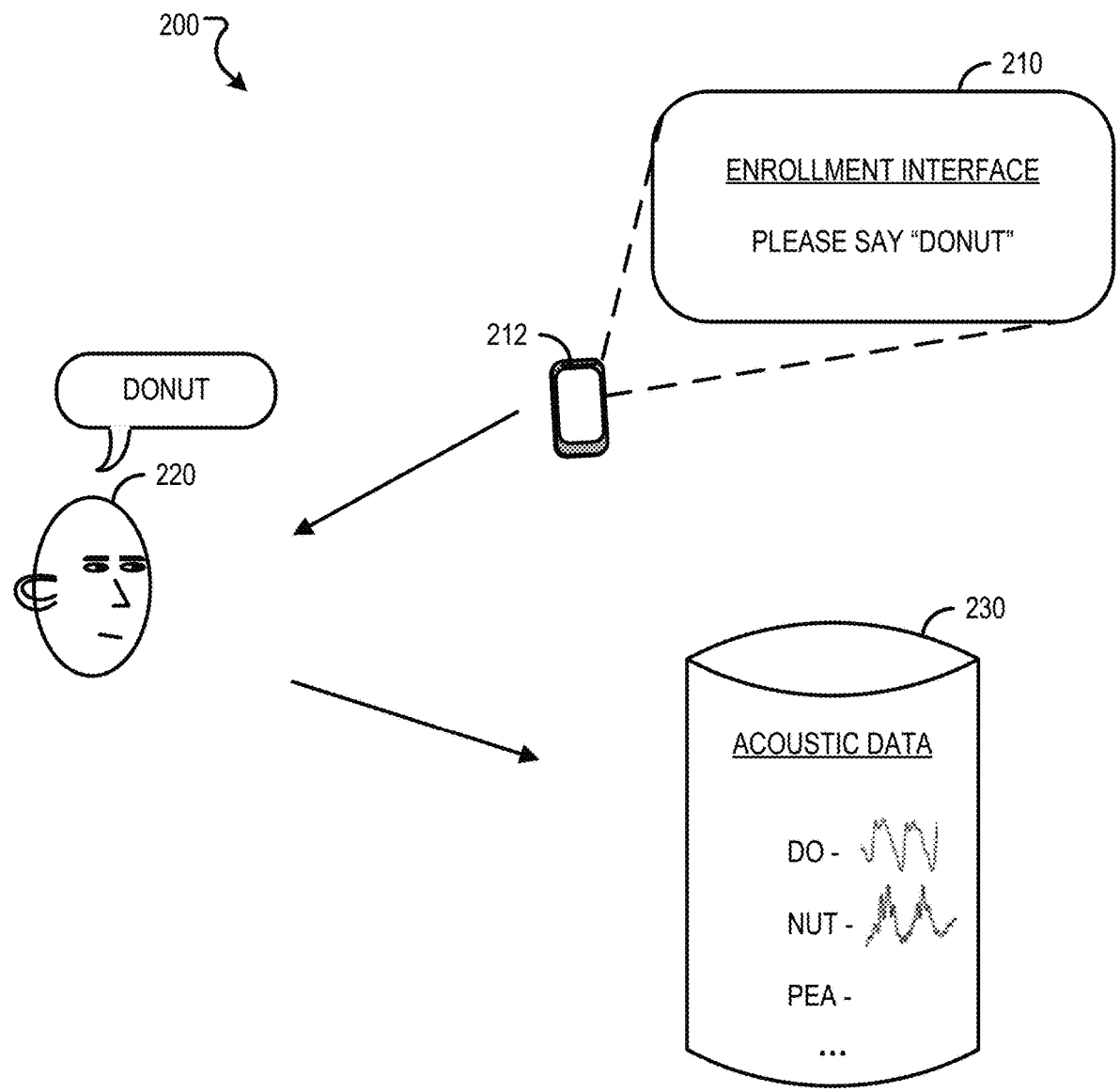
FIG. 2 is a block diagram of a system for voice verification enrollment.

FIG. 2 is a block diagram of a system 200 for voice verification enrollment. The system may include an enrollment interface 210 and an acoustic data database 230 for a particular user 220. The system 200 may be a computing device 212, e.g., a mobile phone. The enrollment interface 210 may prompt the particular user 220 to speak an enrollment phrase to enroll the particular user 220 for voice verification. For example, the enrollment interface 210 may prompt the particular user 220 to speak the predefined enrollment phrase "DONUT."

The system 200 may obtain training acoustic data based on the particular user's 220 speech. The system 200 may obtain the training acoustic data by, for example, performing dynamic time warping to align portions of the speech from the particular user 220 with subwords in the enrollment phrase. For example, the system 200 may align a first portion of speech from the particular user 220 with the subword "DO" and a second portion of speech from the particular user 220 with the subword "NUT."

The system 200 may store, in the acoustic data database 230, training acoustic data representing the particular user 220 speaking each of the subwords in the enrollment phrase. For example, the system 200 may store training acoustic data representing the particular user 220 speaking the subwords "DO" and "NUT" in the enrollment phrase "DONUT."

For enrollment purposes, the system 200 may use one or more different enrollment phrases. For example, the system 200 may prompt the particular user 220 to speak the enrollment phrase, "THE QUICK BROWN FOX JUMPS OVER THE LAZY DOG" and then prompt the particular user 220 to say "COMPUTER PLEASE LEARN MY VOICE FROM THIS PHRASE I'M CURRENTLY SPEAKING."

The system 200 may use predetermined enrollment phrases, or dynamically generated enrollment phrases. For example, the system 200 may always initially prompt a user associated with a given locale or language to speak the enrollment phrase "DONUT," followed by a predetermined sequence of additional enrollment terms. Additionally or alternatively, the system 200 may dynamically generate one or more enrollment phrases that supplement stored acoustic data. For example, the system 200 may identify candidate enrollment phrases that include subwords for which the system 200 does not have stored training acoustic data representing the particular user 220 speaking the subwords.

The system 200 may continue prompting the particular user 220 to continue speaking different enrollment phrases until the system 200 has training acoustic data representing the particular user 220 speaking at least a minimum threshold amount of subwords a minimum threshold number of times. For example, the system 200 may continue prompting the particular user 220 to continue speaking different enrollment phrases until the system 200 has training acoustic data representing the particular user 220 speaking at least ten different subwords at least two times each. Additionally or alternatively, the system 200 may continue prompting the particular user 220 to continue speaking a particular enrollment phrase until the system 200 has enough training acoustic data for the particular enrollment phrase to satisfy a threshold utterance quality.

In some implementations, the system 200 may also store, in the acoustic data database 230, training acoustic data that the system 200 did not obtain in response to an enrollment phrase. For example, the system 200 may identify training acoustic data representing the particular user 220 speaking voice commands or voice queries, and store the identified training acoustic data in the acoustic data database 230.

Figure 3:
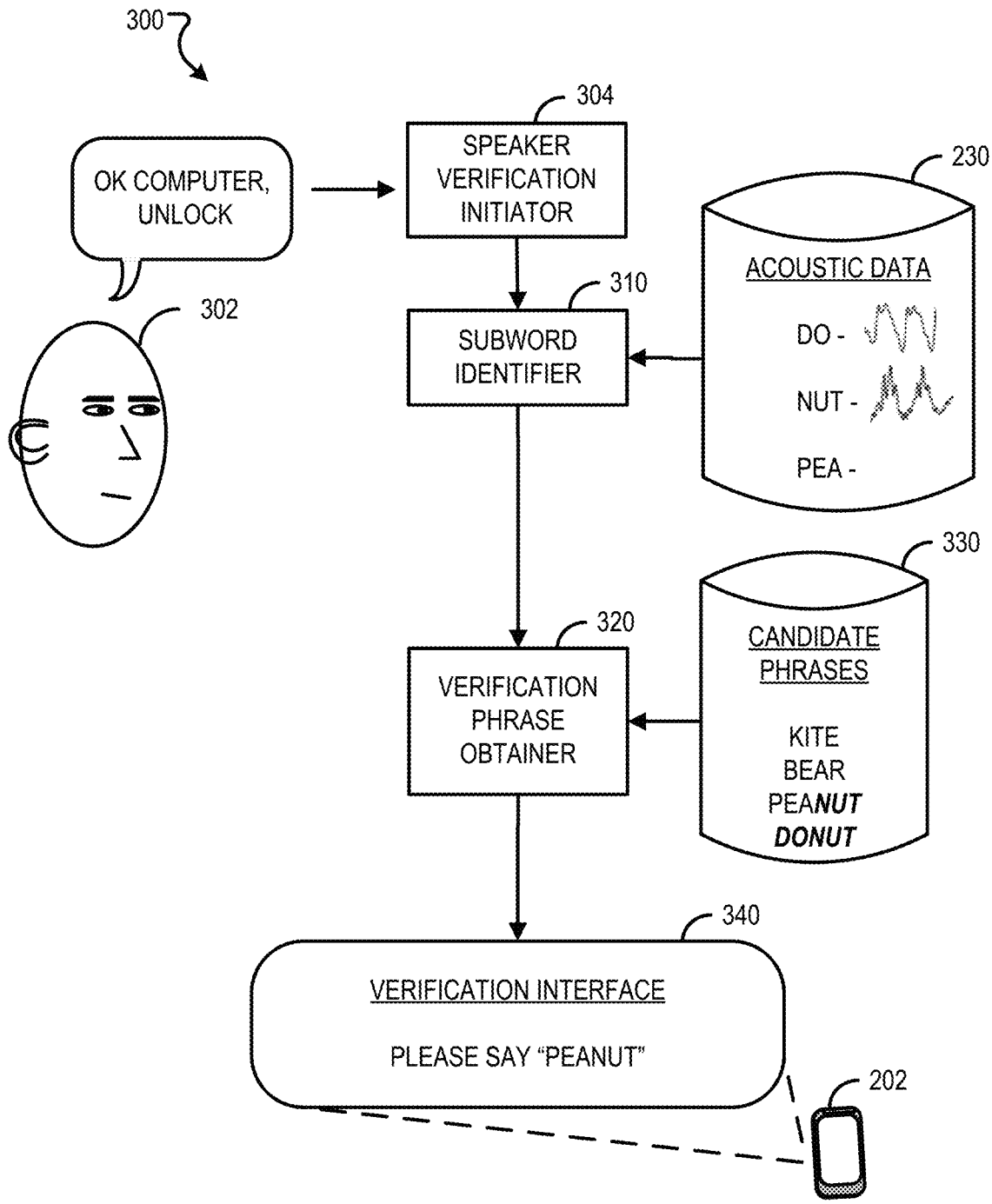
FIG. 3 is a block diagram of a system for obtaining a verification phrase.

FIG. 3 is a block diagram of a system 300 for obtaining a verification phrase. The system 300 may include a speaker verification initiator 304, a subword identifier 310, an acoustic data database 230, a verification phrase obtainer 320, a candidate phrases database 330, and a verification interface 340.

The speaker verification initiator 304, which may be a hotword detector, may receive a voice command and initiate speaker verification based on the voice command. For example, the speaker verification initiator 304 may receive the voice command "OK COMPUTER, UNLOCK," determine that the voice command involves speaker verification, and initiate speaker verification. The speaker verification initiator 304 may initiate speaker verification by providing a speaker verification request to the subword identifier 310.

In response to a request for speaker verification, the subword identifier 310 may identify subwords to be included in a verification phrase. For example, in response to receiving a request for speaker verification from the speaker verification initiator 304, the subword identifier 310 may identify that the subword "NUT" should be included in a verification phrase.

The subword identifier 310 may identify particular subwords to be included in the verification phrase based on the training acoustic data stored in the acoustic data database 230. For example, the subword identifier 310 may identify the subwords "DO" and "NUT" to be included in a verification phrase based on determining that the acoustic data database 230 has stored training acoustic data representing the particular user 200 speaking the subword "DO" and the subword "NUT."

The verification phrase obtainer 320 may additionally or alternatively identify subwords to be included in the verification phrase based on determining subwords for which training acoustic data representing the particular user 220 speaking the subword is not stored in the acoustic data database 230. For example, the verification phrase obtainer 320 may identify the subword "PEA" to be included in the verification phrase based on determining there is little or no stored training acoustic data representing the particular user 220 speaking the subword "PEA."

The verification phrase obtainer 320 may obtain a verification phrase based on the identified subwords. For example, the verification phrase obtainer 320 may obtain the verification phrase "PEANUT" based on the identified subwords "DO," "NUT," and "PEA." The verification phrase obtainer 320 may obtain the verification phrase based on obtaining multiple candidate phrases from a candidate phrases database 330, identifying an obtained candidate phrase that includes one or more of the identified subwords, and selecting the identified candidate phrase as the verification phrase. For example, the verification phrase obtainer 320 may obtain candidates phrases, "KITE," "BEAR," "PEANUT," and "DONUT" from the candidate phrases database 330, identify that the candidate phrase "PEANUT" includes the identified subwords "NUT" and "PEA," and select the identified candidate phrase "PEANUT" as the verification phrase.

The verification phrase obtainer 320 may additionally or alternatively obtain a verification phrase based on which identified subwords have training acoustic data for the particular user 220 and which identified subwords do not have training acoustic data for the particular user 220. The verification phrase obtainer 320 may obtain a verification phrase that has both at least one identified subword that has training acoustic data and at least one identified subword that does not have training acoustic data. For example, the verification phrase obtainer 320 may select the candidate phrase "PEANUT" as the verification phrase based on determining that the candidate phrase "PEANUT" includes the identified subword "NUT" that has training acoustic data and includes the identified subword "PEA" that does not have training acoustic data.

In some implementations, the verification phrase obtainer 320 may obtain a verification phrase from the candidate phrases based on determining a candidate phrase includes a minimum threshold amount of subwords and a percentage of the subwords in the candidate phrase are subwords that have training acoustic data for the particular user 220. For example, the verification phrase obtainer 320 may select a candidate phrase "I ATE SIX PEANUT BUTTER SANDWICHES TODAY" as a verification phrase based on determining that the candidate phrase includes at least ten subwords and approximately 90% of the subwords in the candidate phrase are subwords that have training acoustic data for the particular user 220.

In selecting a candidate phrase as a verification phrase, the verification phrase obtainer 320 may order a list of obtained candidate phrases by the number of subwords in each candidate phrase for which training acoustic data is stored. From the ordered list, the verification phrase obtainer 320 may select a candidate phrase that has a minimum threshold number of subwords and a minimum percentage of subwords that have training acoustic data for the particular user 220.

In some implementations, the verification phrase obtainer 320 may obtain a verification phrase based on an indication of sound discriminativeness of identified subwords. The verification phrase obtainer 320 may generally select a candidate phrase including subwords that are more sound discriminative. The verification phrase obtainer 320 may determine an indication of a sound discriminativeness of each identified subword and obtain a verification phrase based on selecting a candidate phrase that includes (i) at least one identified subword that is a subword that is particularly sound discriminative and has stored acoustic data for the particular user 220 and (ii) at least one identified subword that is a subword that is particularly sound discriminative and does not have stored acoustic data for the particular user 220. For example, the verification phrase obtainer 320 may select the candidate phrase "PEANUT" as the verification phrase based on determining that the candidate phrase "PEANUT" includes an identified subword "NUT" that has stored acoustic data and is particularly sound discriminative, and includes an identified subword "PEA" that does not have stored acoustic data and is also particularly sound discriminative.

In some implementations, the verification phrase obtainer 320 may obtain a candidate phrase without a candidate phrases database 330. For example, the verification phrase obtainer 320 may generate a candidate phrase "NUT PEA"

as the verification phrase based on generating a candidate phrase that includes (i) an identified subword "NUT" that has stored acoustic data and is particularly sound discriminative and (ii) an identified subword "PEA" that does not have stored acoustic data and is also particularly sound discriminative.

The verification interface 340 may prompt the speaker 302 to speak the verification phrase. For example, the verification interface 340 may output on a display of a mobile computing device 202, "PLEASE SAY 'PEANUT.'" Additionally or alternatively, the verification interface 340 may output synthesized speech of "PLEASE SAY 'PEANUT.'"

Figure 4:
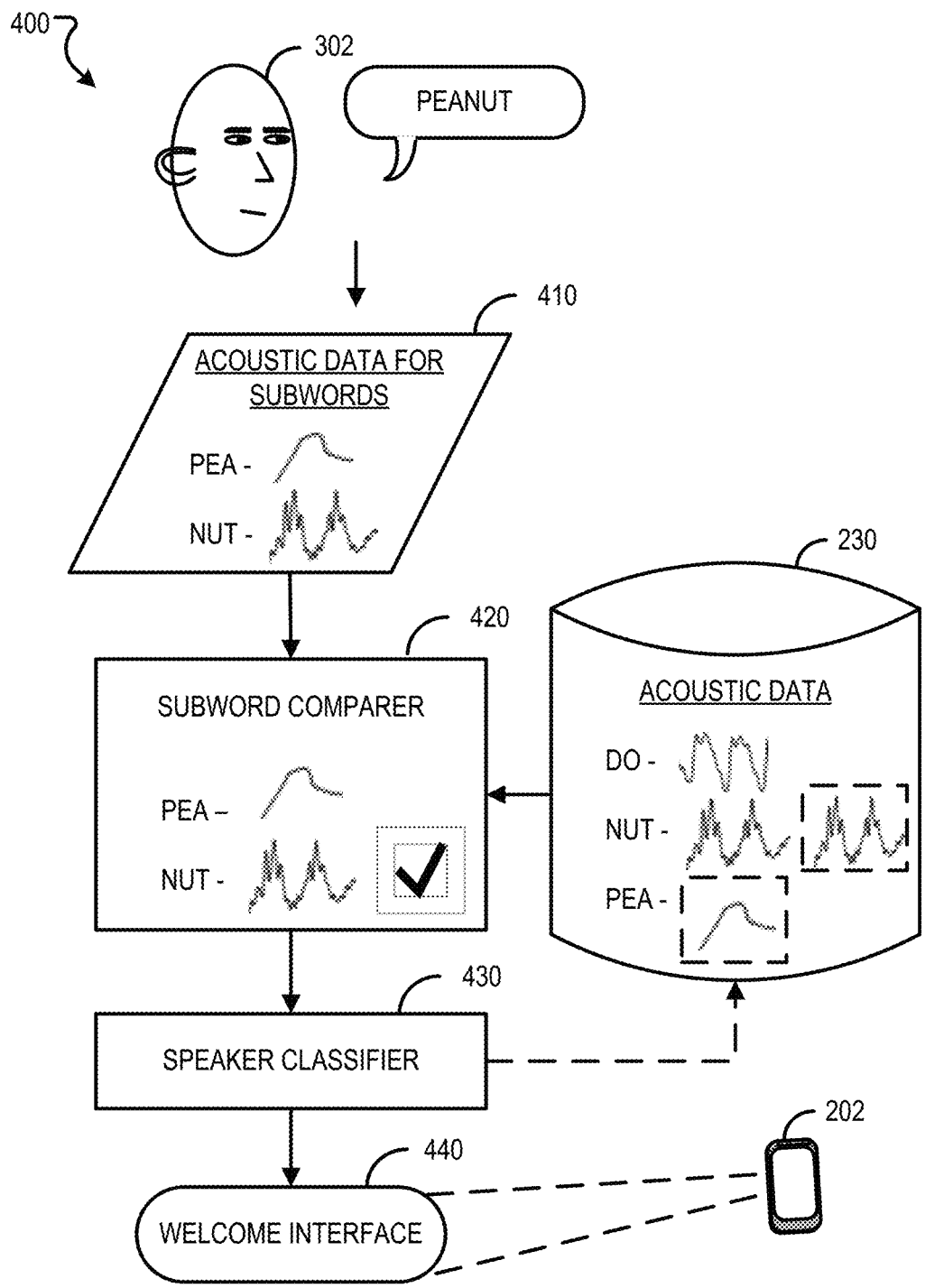
FIG. 4 is a block diagram of a system for verifying an identity of a speaker.

FIG. 4 is a block diagram of a system 400 for verifying an identity of a speaker 302. The system 400 may include a subword comparer 420, a speaker classifier 430, and a welcome interface 440.

The system 400 may obtain acoustic data 410 based on the speaker's speech. The system 400 may obtain acoustic data by performing dynamic time warping to align portions of the speech from the speaker 302 with subwords in the verification phrase. For example, the system 400 may align a first portion of speech from the speaker 302 with the subword "PEA" and a second portion of speech from the speaker 302 with the subword "NUT." If the system 400 is unable to obtain acoustic data 410 for the verification phrase from the speaker's speech, the system 400 may generate an error. For example, the system 400 may be unable to align a verification phrase, "PEANUT," if the speaker 302 speaks a completely differently phrase "AARDVARK" and may generate an error asking the speaker to repeat the verification phrase.

The subword comparer 420 may receive the obtained acoustic data 410 representing the speaker 302 speaking one or more subwords of a verification phrase. For example, the subword comparer 420 may receive obtained acoustic data 410 representing the speaker 302 speaking the subwords "PEA" and "NUT" of the verification phrase "PEANUT."

The subword comparer 420 may compare the obtained acoustic data 410 with stored training acoustic data in the acoustic data database 230 representing the particular user 220 speaking the subwords. For example, the subword comparer 420 may determine a distance between the obtained acoustic data 410 representing the speaker 420 speaking the subword "NUT" and the stored training acoustic data representing the particular user 220 speaking the subword "NUT."

The subword comparer 420 may compare only obtained acoustic data for subwords that have training acoustic data for the subwords. For example, the subword comparer 420 may determine to compare the obtained acoustic data for the subword "NUT" based on determining that there is stored training acoustic data for the subword "NUT." In another example, the subword comparer 420 may determine not to compare the obtained acoustic data for the subword "PEA" based on determining that there is no stored training acoustic data for the subword "PEA."

Additionally or alternatively, the subword comparer 420 may compare obtained acoustic data for subwords that do not have training acoustic data with non-user specific acoustic data to verify that the correct subword was spoken. For example, the subword comparer 420 may compare obtained acoustic data for the subword "PEA" with non-user specific acoustic data for the subword "PEA" to verify that the subword "PEA" was spoken. In some implementations, the subword comparer 420 may compare obtained acoustic data for subwords that do not have training acoustic data with stored training acoustic data for similar sounding subwords. For example, the subword comparer 420 may compare the obtained acoustic data for the subword "PEA" with stored training acoustic data for a subword "PE."

The subword comparer 420 may generate a match score for each compared subword based on the one or more comparisons of the obtained acoustic data and the stored training acoustic data. The match score may indicate the likelihood that the particular user 220 spoke the subword corresponding to the obtained acoustic data. For example, the subword comparer 420 may determine a match score of 90% that indicates 90% likelihood of an identity of the speaker 302 of the subword "PEA" as the particular user 220 and a match score of 100% that indicates 100% likelihood of an identity of the speaker 302 of the subword "DO" as the particular user 220.

The subword comparer 420 may generate the match score for each compared subword based on determining a distance between the acoustic data and the stored training acoustic data for the compared subword. The subword comparer 420 may determine the distance for each subword based on computing L2 distances or performing dynamic time warping matching. In some implementations when the subword comparer 420 may compare obtained acoustic data for subwords that do not have training acoustic data with stored training acoustic data for similar sounding subwords, the speaker classifier 430 may make the comparison more lenient. For example, when the subword comparer 420 compares obtained acoustic data for the subword "PEA" with training acoustic data for the subword "PE," the subword comparer 420 may halve any distances.

The subword comparer 420 may generate a final score based on the match scores. The subword comparer 420 may generate the final score by averaging the match scores. For example, the subword comparer 420 may generate a final score of 95% based on averaging a 90% match score for the subword "NUT" and a 100% match score for the subword "DO."

In some implementations, the subword comparer 420 may weight comparisons between obtained acoustic data and stored training acoustic data differently for particular subwords. The subword comparer 420 may provide greater weight to comparisons for subwords that are determined to be more sound discriminative or subwords for which more stored acoustic data is available. For example, the subword comparer 420 may determine that the subword "NUT" is more sound discriminative than the subword "DO" and weight the match score of 100% for the subword "NUT" twice as much so that the final score is 97%. In some implementations, the subword comparer 420 may provide the match scores to the speaker classifier 430 for the speaker classifier to generate a final score.

The speaker classifier 430 may make a classification if the speaker 302 is the particular user 220 based on determining that the obtained acoustic data matches the stored training acoustic data. For example, the speaker classifier 430 may make a classification that the speaker 302 is the particular user 220 based on determining the obtained acoustic data matches the stored training acoustic data because a final score from the subword comparer 420 is 90% or greater. In another example, the speaker classifier 430 may make a classification that the speaker 302 is not the particular user 220 based on determining the obtained acoustic data does not match the stored training acoustic data because a final score from the subword comparer 420 is less than 90%.

If the speaker classifier 430 makes the classification that the speaker 302 is not the particular user 220, another verification phrase may be requested, and the speaker 302 may be prompted to speak the verification phrase. For example, a locked mobile device may remain locked and may prompt the speaker 302, "SORRY VOICE NOT RECOGNIZED, PLEASE TRY SPEAKING INSTEAD 'CHESTNUT.'" Additionally or alternatively, if the speaker classifier 430 makes the classification that the speaker 302 is not the particular user 220, the same verification phrase may be requested. For example, a locked mobile device may remain locked and may prompt the speaker 302, "SORRY VOICE NOT RECOGNIZED, PLEASE TRY REPEATING 'PEANUT.'" In some implementations, the speaker classifier 430 may prompt the speaker 302 for a particular phrase a pre-determined number, e.g., two, three, or four, of times.

If the speaker classifier 430 makes the classification that the speaker 302 is the particular user 220, the speaker classifier 430 may add the obtained acoustic data to the acoustic data database 230 as training acoustic data. For example, the speaker classifier 430 may store the obtained acoustic data for the subword "NUT" as representing a second instance of the particular user 220 speaking the subword "NUT" and store the obtained acoustic data for the subword "PEA" as representing a first instance of the particular user 220 speaking the subword "PEA." In adding the obtained acoustic data to the acoustic data database 230, the speaker classifier 430 may average the obtained acoustic data for a particular subword. For example, the speaker classifier 430 may average acoustic data for two instances of the particular user 220 speaking the subword "NUT." By adding the obtained acoustic data to the acoustic data database 230 as acoustic training data, the speaker classifier 430 may make future comparisons of obtained acoustic data and stored training acoustic data for subwords, e.g., "NUT," more accurate, and enable additional subwords to be compared in the future as the subwords that initially did not have stored training acoustic data, e.g., "PEA," may now have stored training acoustic data.

If the speaker classifier 430 makes the classification that the speaker 302 is the particular user 220, the speaker classifier 430 may additionally or alternatively display the welcome interface 430. For example, the welcome interface 430 may be an interface that is initially displayed on the mobile device 202 after the mobile device 202 is unlocked.

Different configurations of the systems 200, 300, and 400 may be used where functionality of the enrollment interface 210, acoustic data database 230, speaker verification initiator 304, subword identifier 310, verification phrase obtainer 320, verification interface 340, subword comparer 420, speaker classifier 430, and welcome interface 440 may be combined, further separated, distributed, or interchanged. The systems 200, 300, and 400 may be implemented in a single device, e.g., a mobile device, or distributed across multiple devices, e.g., a client device and a server device.

Figure 5:
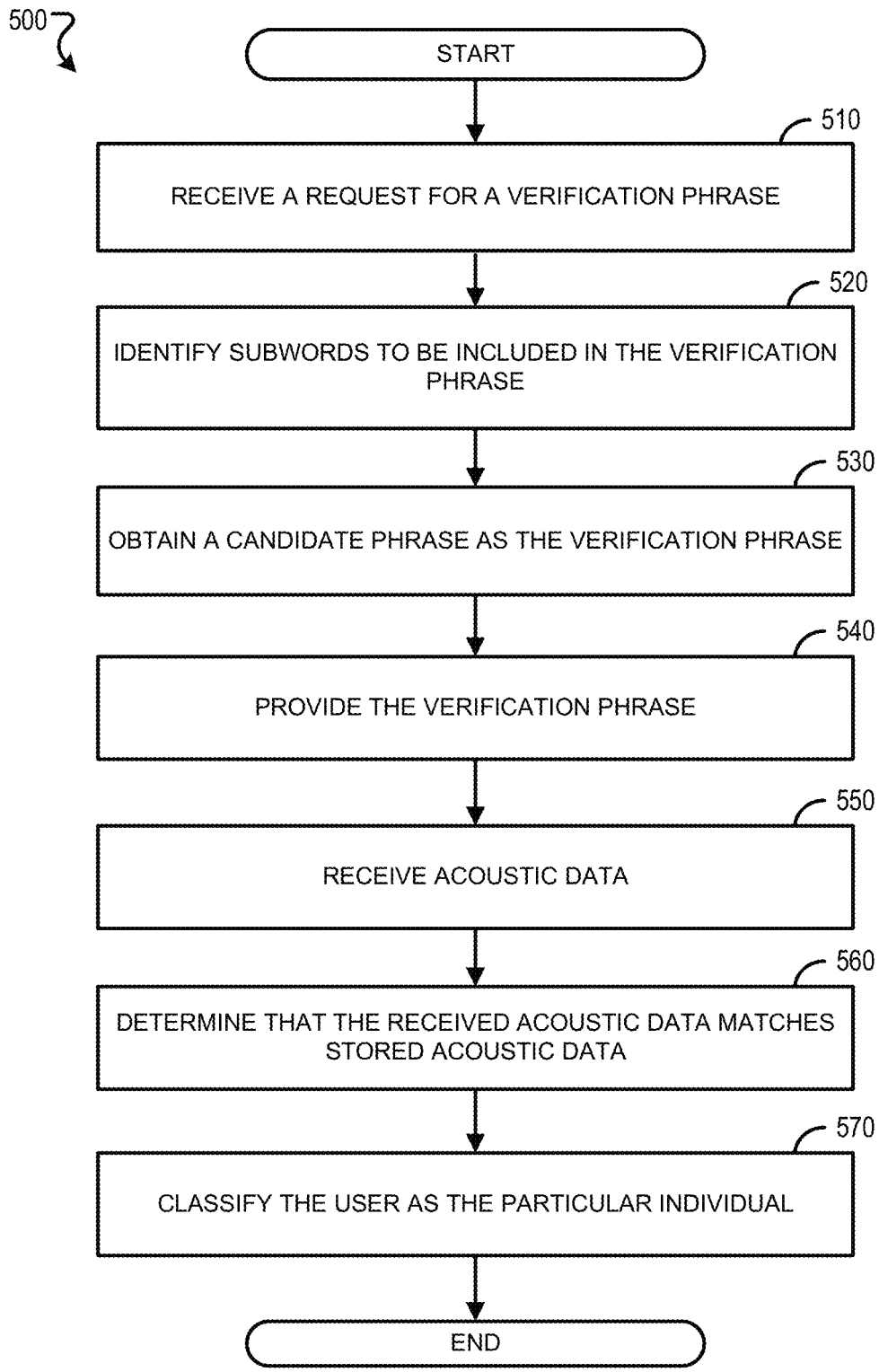
FIG. 5 is another flowchart of an example process for verifying an identity of a speaker.

FIG. 5 is a flowchart of an example process 500 for verifying an identity of a speaker 302. The following describes the processing 500 as being performed by components of the systems 300 and 400 that are described with reference to FIGS. 3 and 4. However, the process 500 may be performed by other systems or system configurations.

The process 500 may include receiving a request for a verification phrase for verifying the identity of the speaker 302 (510). For example, the system 200 may receive a voice command "OK COMPUTER, UNLOCK" from the speaker 302 to unlock the mobile device 202, the speaker verification initiator 304 may provide a request for the verification phrase to the subword identifier 310, and the subword identifier 310 may receive the request for the verification phrase.

The process 500 may include identifying subwords to be included in the verification phrase (520). For example, in response to receiving the request for the verification phrase for verifying the identity of the speaker 302, the subword identifier 310 may identify that the subwords "I," "WANT," "TO," "BE," "AN," "ASTRO," "NAUT," "WHEN," "GROW," and "UP," should be included in a verification phrase based on determining that training acoustic data representing the particular user 220 speaking the subwords "I," "WANT," "TO," "BE," "AN," "NAUT," "WREN," "GROW," and "UP," is stored in the acoustic data database 230 and determining that the subword "ASTRO" is particularly sound discriminative and that no training acoustic data representing the particular user 220 speaking the subword "ASTRO" is stored in the acoustic data database 230.

The process 500 may include obtaining a candidate phrase that includes at least some of the identified subwords as the verification phrase (530). For example, in response to identifying the subwords to be included in the verification phrase, the verification phrase obtainer 320 may obtain multiple candidate phrases "I WANT TO BE AT GREAT FALLS PARK TODAY" and "I WANT TO BE AN ASTRONAUT WHEN I GROW UP" from a candidate phrases database 330, determine that the particular candidate phrase, "I WANT TO BE AN ASTRONAUT WHEN I GROW UP," (i) includes at least ten subwords, (ii) at least 90% of the subwords have stored training acoustic data, and (iii) includes the identified subword "ASTRO" that is particularly sound discriminative and for which there is no stored training acoustic data, and based on the determination, select the particular candidate phrase as the verification phrase.

The process 500 may include providing the verification phrase as a response to the request for the verification phrase for verifying the identity of the speaker 302 (540). For example, the verification interface 340 may display "PLEASE SAY 'I WANT TO BE AN ASTRONAUT WHEN I GROW UP.'"

The process 500 may include obtaining acoustic data representing the speaker 302 speaking the subwords of the verification phrase (550). For example, the subword comparer 420 may obtain acoustic data representing the speaker 302 speaking each subword in the candidate phrase "I WANT TO BE AN ASTRONAUT WHEN I GROW UP."

The process 500 may include determining that the obtained acoustic data matches stored training acoustic data (560). For example, the subword comparer 420 may generate a final score of 90% based on averaging match scores for each of the subwords "I," "WANT," "TO," "BE," "AN," "NAUT," "WHEN," "GROW," and "UP," where the match scores are determined based on calculating a distance for each of the subwords between the obtained acoustic data and the stored training acoustic data.

The process 500 may include classifying the speaker 302 as the particular user 220 (570). For example, the speaker classifier 430 may determine that a final score of 90% generated by the subword comparer 420 is at least 90%. In response to classifying the speaker 302 as the particular user 220, the speaker classifier 403 may store the obtained acoustic data in the acoustic data database 230 as training acoustic data and trigger a display of a welcome interface 440.

In some implementations, principles of the process 500 may also be used for speaker identification. For example, the system 400 may compare the obtained acoustic data to stored training acoustic data for multiple users to generate final scores for each of the multiple users, determine that the final score for the particular user is the only final score that is at least 90%, and identify the speaker as the particular user.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method when executed on data processing hardware causes the data processing hardware to perform operations comprising:
   receiving a command input by a particular user;
   in response to receiving the command, generating a verification phrase for the particular user, the verification phrase comprising at least one subword obtained from stored enrollment audio data representing the particular user speaking the subword;
   providing, as output from a user interface, a message informing the particular user to speak the verification phrase to verify the identity of the particular user;
   receiving verification audio data representing an unverified user speaking the verification phrase;
   determining whether the unverified user speaking the verification phrase comprises the particular user based on the stored enrollment audio data and the verification audio data; and
   in response to determining that the unverified user speaking the verification phrase comprises the particular user, verifying an identity of the unverified user as the particular user.

2. The computer-implemented method of claim 1, wherein providing the message as output from the user interface comprises displaying the message as output on a display in communication with the data processing hardware.

3. The computer-implemented method of claim 1, wherein providing the message as output from the user interface comprises outputting the message as synthesized speech.

4. The computer-implemented method of claim 1, wherein the operations further comprise, after verifying the identity of the unverified user as the particular user, displaying a welcome interface on a display in communication with the data processing hardware.

5. The computer-implemented method of claim 1, wherein the operations further comprise:
   receiving the enrollment audio data representing the particular user speaking the at least one subword; and
   storing the received enrollment audio data in memory hardware in communication with the data processing hardware.

6. The computer-implemented method of claim 5, wherein the operations further comprises determining that the received enrollment audio data contains a minimum number of subwords spoken by the particular user a minimum number of times.

7. The computer-implemented method of claim 6, wherein the subwords comprise phonemes.

8. The computer-implemented method of claim 5, wherein receiving the enrollment audio data continues until enrollment audio data has been received that satisfies an utterance quality threshold.

9. The computer-implemented method of claim 1, wherein determining whether the unverified user speaking the verification phrase comprises the particular user comprises:
   determining whether the verification audio data matches the stored enrollment audio data; and
   in response to determining that the verification audio data matches the stored enrollment audio data, classifying the unverified user as the particular user.

10. A system:
   data processing hardware: and
   memory hardware in communication with the data processing hardware and storing instructions that when executed on the data processing hardware cause the data processing hardware to perform operations comprising:
      receiving a command input by a particular user;
      in response to receiving the command, generating a verification phrase for the particular user, the verification phrase comprising at least one subword obtained from stored enrollment audio data representing the particular user speaking the subword;
      providing, as output from a user interface, a message informing the particular user to speak the verification phrase to verify the identity of the particular user;
      receiving verification audio data representing an unverified user speaking the verification phrase;
      determining whether the unverified user speaking the verification phrase comprises the particular user based on the stored enrollment audio data and the verification audio data; and
      in response to determining that the unverified user speaking the verification phrase comprises the particular user, verifying an identity of the unverified user as the particular user.

11. The system of claim 10, wherein determining whether the unverified user speaking the verification phrase comprises the particular user comprises:

determining whether the verification audio data matches the stored enrollment audio data; and in response to determining that the verification audio data matches the stored enrollment audio data, classifying the unverified user as the particular user.

12. The system of claim 10, wherein providing the message as output from the user interface comprises displaying the message as output on a display in communication with the data processing hardware.

13. The system of claim 10, wherein providing the message as output from the user interface comprises outputting the message as synthesized speech.

14. The system of claim 10, wherein the operations further comprise, after verifying the identity of the unverified user as the particular user, displaying a welcome interface on a display in communication with the data processing hardware.

15. The system of claim 10, wherein the operations further comprise:

receiving the enrollment audio data representing the particular user speaking the at least one subword; and storing the received enrollment audio data in memory hardware in communication with the data processing hardware.

16. The system of claim 15, wherein the operations further comprises determining that the received enrollment audio data contains a minimum number of subwords spoken by the particular user a minimum number of times.

17. The system of claim 16, wherein the subwords comprise phonemes.

18. The system of claim 16, wherein receiving the enrollment audio data continues until enrollment audio data has been received that satisfies an utterance quality threshold.

* * * * *